May 23, 1939.  M. E. J. H. BIKAR  2,159,584
FIXING ELECTRIC MOTORS TO A VEHICLE TRUCK
Filed Oct. 21, 1936
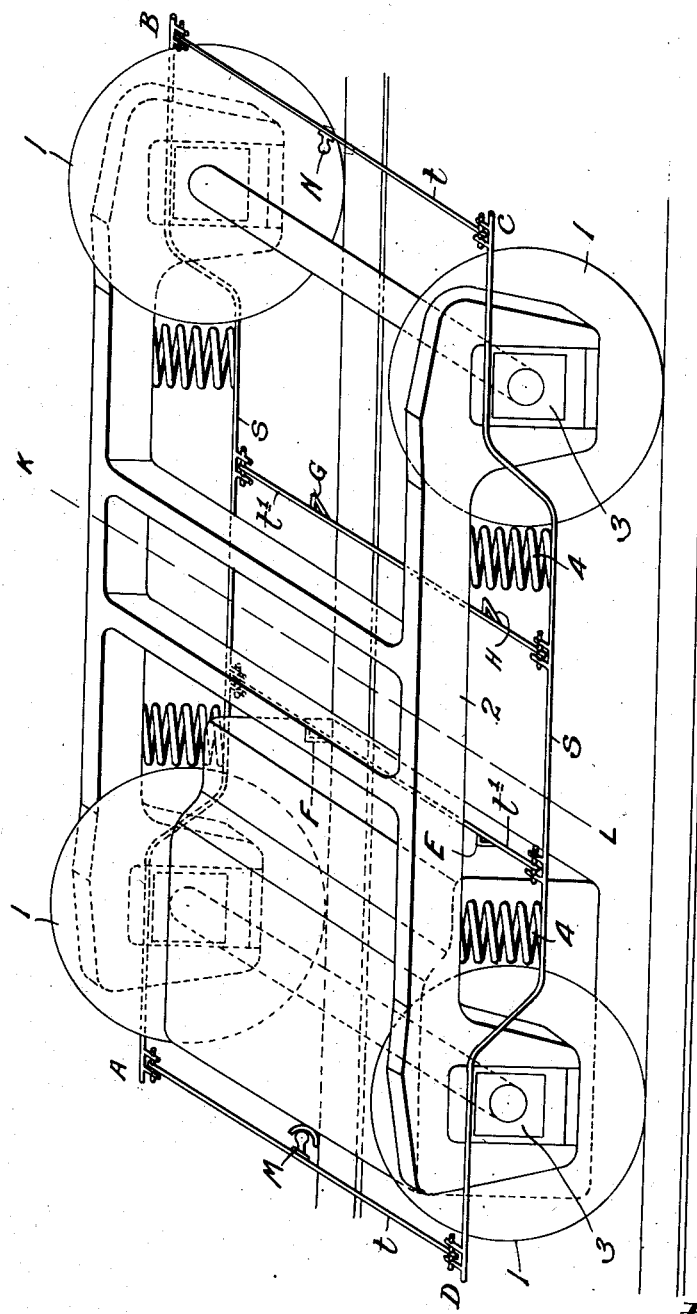
Inventor:
MARIE EDOUARD JEAN HENRI BIKAR
BY: Francis E. Boyce Patented May 23, 1939

2,159,584

UNITED STATES PATENT OFFICE 2,159,584

FIXING ELECTRIC MOTORS TO A VEHICLE TRUCK

Marie Edouard Jean Henri Bikar, Brussels, Belgium, assignor to "Aciéries de Haine Saint-Pierre et Lesquin", Société Anonyme, Haine Saint-Pierre, Belgium, a company Application October 21, 1936, Serial No. 106,811
In Belgium October 25, 1935

3 Claims. (Cl. 105—133)

This invention relates to the suspension of an electric motor or motors on a vehicle truck.

One object of the invention is to provide novel means to support the motors on trucks of the type employed most commonly for non-electric rolling stock in such manner as to render the suspension of the motor quite independent from the suspension of the vehicle so that the motor is not subjected to the shocks caused by the variations in the level of the track.

With this and other objects in view, the invention essentially consists in the special arrangements and combinations of parts hereinafter fully described and pointed out in the appended claims.

The accompanying drawing shows diagrammatically the principle upon which the invention is based.

Referring to the drawing, 1 denotes the wheels and 2 the side sills of a railway vehicle truck. The motor supporting frame comprises a pair of side members S which rest on the axle boxes 3 and which, according to the invention are connected together at their opposite ends by end transverse members $t$ and at intermediate portions by one or more intermediate transverse members $t^1$. The transverse members $t$ are articulated to the side members S preferably by horizontal pivots extending longitudinally of the side frame members S as indicated at A, B, C and D.

Between the side sills 2 and the members S are disposed springs 4.

Each truck can be provided with two motors which may be disposed on opposite sides of the transverse center line KL of the truck, so that each motor will be supported by the truck at three points: M, E, and F for one motor and at N, H and G for the other motor. At the points E, F and G, H the support is effected through lugs formed on the motors and between which and the members $t^1$ may be interposed Belleville washers, rubber springs or other resilient devices.

The supporting of the motors by the members $t$ is effected at the points M and N.

This support is effected in any suitable manner to provide a single point of support between each member and the respective motor.

As will be easily understood, the motors are each suspended on a three point suspension in an elastic manner without being subjected to the deformations of the truck produced by the inequalities of the railway track.

When distortion occurs in the truck because of the passing of a vehicle over a rail joint or over a low spot at a crossing, the four wheels of the truck will no longer have their centers in the same plane, but such distortion will have no reaction on the motors.

What I claim is:

1. In a vehicle truck having axle boxes, a motor-supporting frame comprising longitudinally extending members resting directly on said axle boxes and extending beyond the same, transverse members articulated to the ends of said longitudinal members, intermediate transverse members articulated at their ends to said longitudinal members, said transverse members having means for supporting a motor between them, and a vehicle truck frame spring supported on said longitudinal members.

2. In a vehicle truck having axle boxes, a motor-supporting frame comprising longitudinally extending members resting directly on said axle boxes and extending beyond the same, transverse members articulated to the ends of said longitudinal members, intermediate transverse members articulated at their ends to said longitudinal members, the end transverse members each having means disposed at the middle of its length for pivotally connecting one side of a motor thereto and each of the intermediate transverse members having means for supporting the other side of the motor at two points, and a vehicle truck frame spring supported on said longitudinal members.

3. In a vehicle truck having axle boxes, a motor-supporting frame comprising longitudinally extending members resting directly on said axle boxes and extending beyond the same, transverse members articulated to the ends of said longitudinal members, intermediate transverse members articulated at their ends to said longitudinal members, the end transverse members each having means disposed at the middle of its length for pivotally connecting one side of a motor thereto and each of the intermediate transverse members having means for supporting the other side of the motor at two points, said two points being disposed symmetrically to the longitudinal axis of the truck, and a vehicle truck frame spring supported on said longitudinal members.

MARIE EDOUARD JEAN HENRI BIKAR.